Jan. 23, 1923.

S. S. SNYDER ET AL.
POISON CONTAINER.
FILED MAY 10, 1921.

1,443,287

WITNESSES

INVENTORS
SAMUEL S. SNYDER.
GEORGE W. SHORT.
BY
ATTORNEYS

Patented Jan. 23, 1923.

1,443,287

UNITED STATES PATENT OFFICE.

SAMUEL S. SNYDER AND GEORGE W. SHORT, OF WHITE SULPHUR SPRINGS, MONTANA.

POISON CONTAINER.

Application filed May 10, 1921. Serial No. 468,230.

*To all whom it may concern:*

Be it known that we, SAMUEL S. SNYDER and GEORGE W. SHORT, citizens of the United States, and residents of White Sulphur Springs, in the county of Meagher and State of Montana, have invented a new and Improved Poison Container, of which the following is a full, clear, and exact description.

This invention relates to improvements in poison containers, an object of the invention being to provide an improved construction of poison container in which the poison is readily accessible to gophers, rats, mice, squirrels, or similar small animals or rodents, and which is so constructed as to be inaccessible to fowl and birds because the latter find their food by sight.

A further object is to provide a container of the character described, which can be readily secured to the ground and moved from one location to another, and which will be so constructed that it is not liable to be broken or trampled by draft animals moving over the field.

With these and other objects in view the invention consists in certain novel features of construction, and combinations and arrangements of parts, as will be more fully hereinafter described and pointed out in the claim.

In the accompanying drawings—

Figure 1:
Figures 1 and 2 are perspective views illustrating our improved trap in operative position.
Figure 2:
Figure 3:
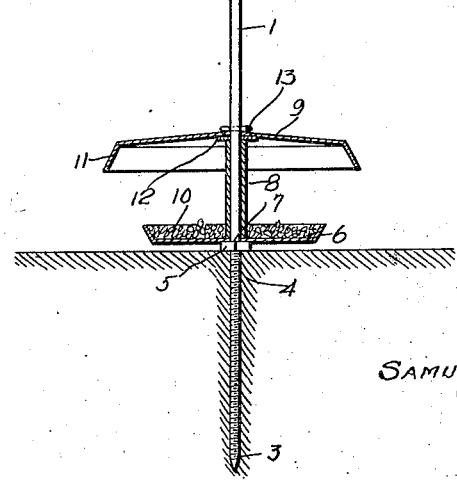
Figure 3 is a view partly in elevation and partly in vertical section illustrating our improved container.

1 represents a relatively long rod which may have an eye or handle 2 at its upper end, and which is provided with a pointed lower end 3 to facilitate its passage into the ground by downward pressure on the rod. A portion at least of this rod 1 is screw threaded, as shown at 4, for the reception of a nut 5 and a receptacle 6 is made with a central opening 7 to receive the rod 1 and rests upon the nut 5.

By adjusting the nut 5 vertically any desired length of lower end or prong may be provided to give the device the desired depth of anchorage in the ground.

A sleeve 8 is positioned on the rod 1 above the receptacle 6 and a cover 9 is located on the rod and rests upon the sleeve 8, said sleeve holding the cover of the receptacle in spaced relation.

The receptacle 6 is adapted to contain poisoned oats 10, or any other poisoned material, and it will be noted that said receptacle 6 is of appreciably less diameter than the cover 9 and that said cover 9 has a depending flange 11 of any desired depth, so that the cover operates to not only shield the container from the weather, but to prevent birds, fowls, and the like, from viewing the container.

Gophers, rats, mice, squirrels, rodents of any sort, and small animals find their food by the sense of smell and they will readily locate the poisoned material 10 and eat the same and die, whereas fowl and birds of different sorts locate their food by sight and the cover 9 will prevent them from seeing the poison food and they will not be destroyed thereby.

It will be noted that the rod 1 is of appreciably great length, so that it extends high enough above the ground to be readily seen and prevent draft animals and the like from stepping on the container to destroy the same.

A washer 12 is preferably interposed between the upper end of the sleeve 8 and the cover 9 and a cotter pin 13 projected through the rod 1 above the cover 9 to prevent the latter from being moved upwardly by a bird or fowl.

The container can be readily moved from place to place and securely anchored, as will be readily understood.

Various slight changes might be made in the general form and arrangement of the parts described without departing from the invention, and hence we do not limit ourselves to the precise details set forth, but consider ourselves at liberty to make such changes and alterations as fairly fall within the spirit and scope of the appended claim.

We claim:

A device of the character described, comprising a relatively long rod having a sharp lower end, and a screw threaded portion, a nut on the screw threaded portion, a container on the rod located against the nut, a sleeve on the rod above the container, a cover on the rod supported on the sleeve, a depending flange on the cover, and said cover of appreciably greater diameter than the receptacle.

SAMUEL S. SNYDER.
GEORGE W. SHORT.